US012771132B2

United States Patent

Paulik et al.

(10) Patent No.: US 12,771,132 B2
(45) Date of Patent: Oct. 20, 2026

(54) UTILIZING POWER INFRASTRUCTURE TO PROVIDE STABLE REFERENCE FREQUENCY

(71) Applicant: International Business Machines Corporation, Armonk, NY (US)

(72) Inventors: George Paulik, Rochester, MN (US); Timothy Lindquist, Rochester, MN (US); George Russell Zettles, IV, Rochester, MN (US); Jarrett Betke, Hoffman Estates, IL (US); Daniel Ramirez, Rochester, MN (US); Timothy Clyde Buchholtz, Rochester, MN (US); Kevin O'Connell, Mantorville, MN (US); Austin Carter, Olmsted, MN (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 18/103,273

(22) Filed: Jan. 30, 2023

(65) Prior Publication Data

US 2024/0258795 A1 Aug. 1, 2024

(51) Int. Cl.
*H02J 3/02* (2026.01)
*H02J 3/17* (2026.01)

(52) U.S. Cl.
CPC . *H02J 3/02* (2013.01); *H02J 3/17* (2026.01)

(58) Field of Classification Search
CPC .......................................................... H02J 3/02
See application file for complete search history.

(56) References Cited

U.S. PATENT DOCUMENTS 7,920,663 B1 * 4/2011 Stevens .................. H03L 7/085
713/400
8,416,812 B2 4/2013 Radulescu
8,837,172 B2 9/2014 Imori
(Continued)

FOREIGN PATENT DOCUMENTS

CN 110212762 A * 9/2019 ............ H02M 3/158
CN 110556838 A * 12/2019 ................ H02J 3/36

OTHER PUBLICATIONS

M. Kosmecki et al., "A Methodology For Provision Of Frequency Stability In Operation Planning Of Low Inertia Power Systems," Energies, Jan. 31, 2021, 17 pages, vol. 14, No. 737.
(Continued)

*Primary Examiner* — Suresh Suryawanshi
(74) *Attorney, Agent, or Firm* — Samuel Waldbaum; Ryan, Mason & Lewis, LLP

(57) ABSTRACT

Techniques are provided to convert utility power having an unstable utility frequency into supply power having a stable frequency, which can be distributed and utilized as a system reference. For example, a system comprises a power generator and a power distribution system. The power generator is configured to convert utility power having an unstable utility frequency to supply power having a stable frequency component. The power distribution system is coupled to an output of the power generator, and is configured to distribute the supply power having the stable frequency component to at least one power consumer which is configured to utilize the stable frequency component of the supply power as a reference frequency.

20 Claims, 5 Drawing Sheets

(56) References Cited

U.S. PATENT DOCUMENTS

| | | | | |
|---|---|---|---|---|
| 8,837,272 | B2 | 9/2014 | Wu et al. | |
| 9,620,960 | B2 | 4/2017 | Majumder | |
| 9,876,388 | B2 | 1/2018 | Steiner-Jovic et al. | |
| 10,483,799 | B2 | 11/2019 | Cho et al. | |
| 11,316,345 | B2 | 4/2022 | Madani et al. | |
| 11,368,114 | B2 | 6/2022 | Huang et al. | |
| 2003/0126488 | A1* | 7/2003 | Chen | G06F 1/24 713/322 |
| 2004/0109498 | A1 | 6/2004 | Miller et al. | |
| 2008/0223684 | A1* | 9/2008 | Duffey | F03D 80/00 192/105 R |
| 2010/0118895 | A1 | 5/2010 | Radulescu | |
| 2015/0137596 | A1 | 5/2015 | Steiner-Jovic et al. | |
| 2016/0268462 | A1* | 9/2016 | Kimoto | H10F 77/122 |
| 2016/0329711 | A1 | 11/2016 | Majumder | |
| 2019/0267839 | A1 | 8/2019 | Cho et al. | |
| 2020/0144946 | A1 | 5/2020 | Huang et al. | |
| 2021/0066925 | A1 | 3/2021 | Anichkov | |
| 2021/0210957 | A1 | 7/2021 | Du et al. | |
| 2022/0082649 | A1 | 3/2022 | Duan et al. | |
| 2022/0085609 | A1 | 3/2022 | Kozaki | |
| 2022/0190721 | A1 | 6/2022 | Nicolosi et al. | |
| 2022/0244750 | A1 | 8/2022 | Chen et al. | |

OTHER PUBLICATIONS

L. Lei et al., "Combined Pre-Synchronization And Power Sharing Control For Microgrid Applications," 55th International Universities Power Engineering Conference, Sep. 2020, 6 pages.

F. Conte et al., "Frequency Stability Assessment Of Modern Power Systems: Models Definition And Parameters Identification," arXiv:2104.07330v1, Apr. 15, 2021, 26 pages.

Z. Zhao et al., "Multiple-Time-Scales Hierarchical Frequency Stability Control Strategy Of Medium-Voltage Isolated Microgrid," IEEE Transactions on Power Electronics, Aug. 2016, pp. 5974-5991, vol. 31, No. 8.

S. Bruno et al., "Power Hardware-In-The-Loop Test Of A Low-Cost Synthetic Inertia Controller For Energy Storage System," Energies, Apr. 20, 2022, 18 pages, vol. 15, No. 3016.

* cited by examiner

300

400

UTILIZING POWER INFRASTRUCTURE TO PROVIDE STABLE REFERENCE FREQUENCY

BACKGROUND

This disclosure relates generally to techniques for generating and distributing reference clock signals in, e.g., a synchronous system. The ability to generate and distribute synchronized reference clock signals across multiple systems is not trivial, and is critical in many applications. For example, with quantum applications, the ability to perform a repeatable experiment relies on all quantum devices maintaining synchronous stability with one another. Conventional solutions accomplish system/device synchronization using dedicated equipment (e.g., signal generator, waveform generators, etc.) to generate a reference clock signal, wherein the dedicated equipment must be wired to all components to create a fixed relationship between every device in the system. There are various disadvantages of using dedicated equipment to generate reference clock signals. For instance, such equipment can be very expensive. In addition, since a dedicated connection is required from the equipment to each component or device which needs to be synchronized, scalability becomes challenging as the system grows due to the need to fanout the reference clock signal from the equipment to a relatively large number of system components to be synchronized.

SUMMARY

Exemplary embodiments of the disclosure include techniques for converting utility power having an unstable utility frequency into supply power having a stable frequency, which can be distributed and utilized as a system reference.

For example, an exemplary embodiment includes a system which comprises a power generator and a power distribution system. The power generator is configured to convert utility power having an unstable utility frequency to supply power having a stable frequency component. The power distribution system is coupled to an output of the power generator, and is configured to distribute the supply power having the stable frequency component to at least one power consumer which is configured to utilize the stable frequency component of the supply power as a reference frequency.

Another exemplary embodiment includes an apparatus that is configured to utilize an atomic clock signal to convert utility power having an unstable utility frequency to supply power having a stable frequency component for use as a system reference, wherein the stable frequency component has a frequency that corresponds to a frequency of the atomic clock signal.

Another exemplary embodiment includes a method which comprises: converting utility power having an unstable utility frequency to supply power having a stable frequency component; and distributing the supply power having the stable frequency component to at least one power consumer which is configured to utilize the stable frequency component of the supply power as a reference frequency.

Other embodiments will be described in the following detailed description of exemplary embodiments, which is to be read in conjunction with the accompanying figures.

DETAILED DESCRIPTION

Exemplary embodiments of the disclosure will now be described in further detail with regard to systems and methods for utilizing a power infrastructure to generate and distribute a stable reference frequency signal. The exemplary techniques disclosed herein make use of an existing power infrastructure to generate and distribute supply power (e.g., AC power or DC power) having the stable frequency component to power consumers which are configured to utilize the stable frequency component of the distributed supply power as a reference frequency, thus eliminating the need for utilizing dedicated equipment to generate reference clock signals.

It is to be understood that the various features as shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration". Any embodiment or design described herein as "exemplary" is not to be construed as preferred or advantageous over other embodiments or designs.

Further, it is to be understood that the phrase "configured to" used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, the hardware may comprise discrete circuit elements (e.g., transistors, inverters, etc.), programmable elements (e.g., ASICs, FPGAs, etc.), processing devices (e.g., CPUs, GPUs, etc.), one or more integrated circuits, and/or combinations thereof. Thus, by way of example only, when a circuit is defined to be configured to provide a specific functionality, it is intended to cover, but not be limited to, embodiments where the circuit is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit is in a non-operational state (e.g., not connected nor otherwise deployed in a system, not powered on, not receiving an input, and/or not producing an output) or in a partial operational state.

Figure 1:
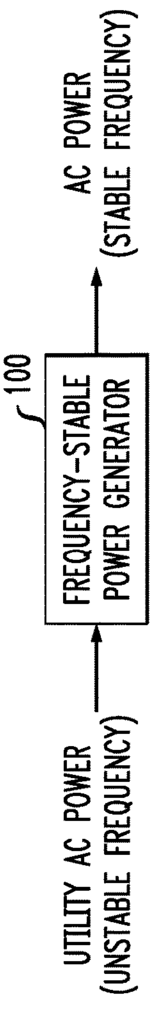
FIG. 1 schematically illustrates a system which is configured to utilize frequency unstable utility power to generate frequency-stable power that is used as a system reference frequency, according to an exemplary embodiment of the disclosure.

FIG. 1 schematically illustrates a system which is configured to utilize frequency unstable utility power to generate frequency-stable power that is used as a system reference frequency, according to an exemplary embodiment of the disclosure. More specifically, FIG. 1 illustrates a frequency-stable power generator system 100 which is configured to receive AC utility power having an unstable frequency, and generate AC power having a stable frequency, according to an exemplary embodiment of the disclosure. The frequency-stable AC power is transmitted over a power distribution system to electronic systems and components. The frequency-stable AC power is utilized to provide AC power to such electronic systems and components. In addition, the frequency-stable AC power is utilized as a system reference frequency signal (or reference clock signal) to perform functions including, but not limited to, synchronizing operations of the electronic systems and components, controlling clocks in synchronous networks, deriving clock signals with clock operating frequencies as needed for a given application, etc. The frequency-stable power generator system 100 can be configured using various embodiments, as will be discussed in detail below.

Figure 2A:
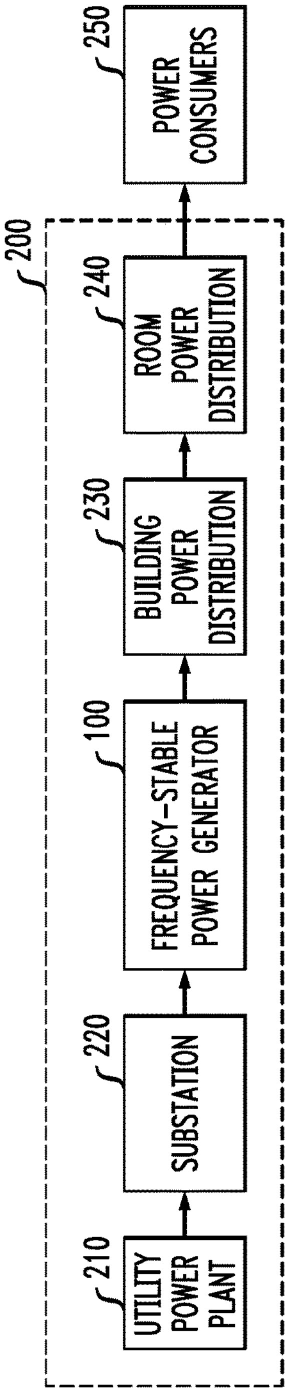
FIGS. 2A, 2B, and 2C schematically illustrate methods for utilizing a power infrastructure to generate and distribute frequency-stable AC power for use as a system reference frequency, according to alternative exemplary embodiments of the disclosure.
Figure 2B:
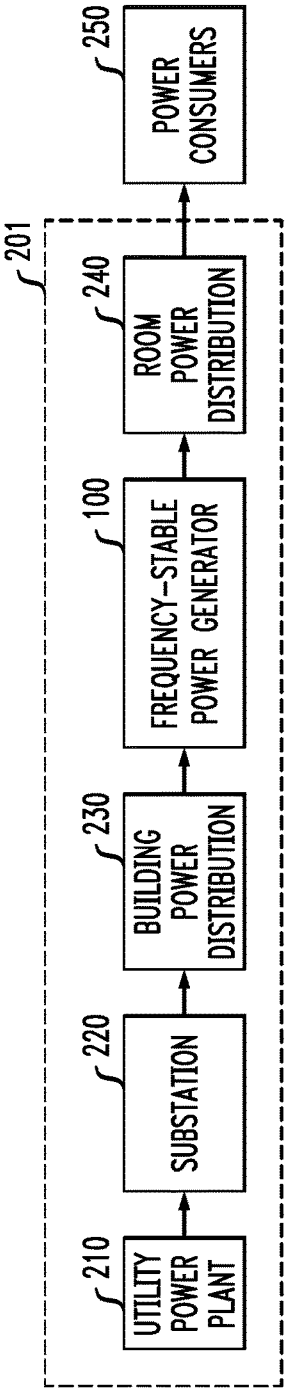
Figure 2C:
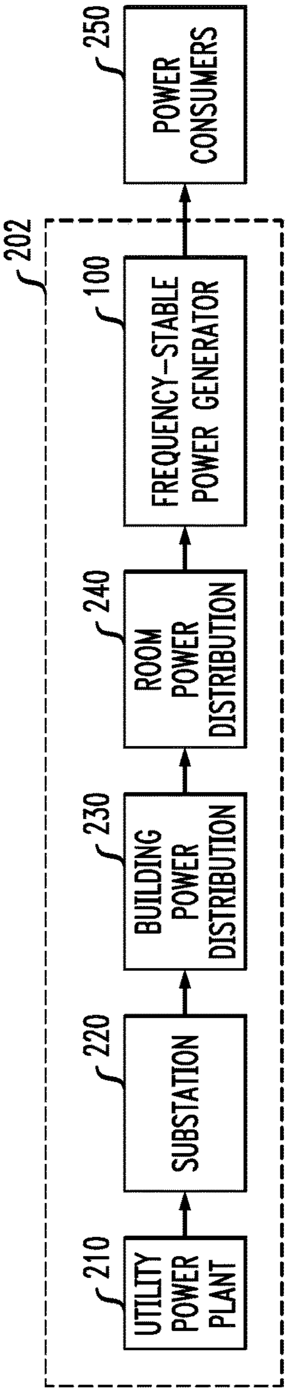

FIGS. 2A, 2B, and 2C schematically illustrate methods for utilizing power infrastructure to generate and distribute frequency-stable AC power for use as a system reference frequency, according to alternative exemplary embodiments of the disclosure. More specifically, FIGS. 2A, 2B, and 2C schematically illustrate methods for implementing the frequency-stable power generator system 100 of FIG. 1 at different locations of a power distribution system to generate frequency-stable AC power from frequency unstable AC power, and utilizing the power distribution infrastructure to deliver the frequency-stable AC power to system components/devices for use as a stable system reference frequency. For example, as schematically illustrated in FIG. 2A, an exemplary power infrastructure 200 which comprises a utility power plant 210, a substation 220, a building power distribution system 230, and a room power distribution system 240, wherein the frequency-stable power generator system 100 is disposed in the power distribution chain between the substation 220 and the building power distribution system 230. FIG. 2A illustrates an exemplary power infrastructure 200 which is configured to provide frequency-stable AC power to a plurality of power consumers 250 (e.g., electronic components, systems, computers, etc.) which are electrically connected to the room power distribution system 240.

The utility power plant 210 comprises a facility that is operated by a utility company, wherein the utility power plant 210 generates AC electricity (or AC power) and transmits the AC power over a network of high-voltage primary transmission lines to a topology of primary, switching, and distribution substations (e.g., substation 220) which, in turn, distribute the AC power to a plurality of utility grids using a network of secondary, medium voltage transmission lines. Each utility grid is configured to distribute power to different towns or regions, or multiple towns or regions, etc., depending on the how the utility grids are configured. Thereafter, low voltage wiring (e.g., service lines, or service drops) supply utility power to buildings and other structures which are connected to a given utility grid.

In some embodiments, the utility AC power (which is generated by the utility power plant 210 and distributed over a wide area power grid) comprises an AC voltage having a nominal utility frequency (alternatively referred to as power frequency, line frequency or mains frequency). For example, in some countries such as the United States, utility AC power is generated and transmitted at a nominal utility frequency of 60 Hz, while in other countries such as European countries, utility AC power is generated and transmitted at a nominal utility frequency of 50 Hz. In reality, however, the exact utility frequency that is transmitted at any given time could vary around the nominal utility frequency, e.g., lower utility frequency when the power grid is heavily loaded, and higher utility frequency when the power grid lightly loaded. In particular, in the United States, the utility frequency can vary from 55 Hz to 65 Hz, and in European countries, the utility frequency can vary from 45 Hz to 55 Hz.

In the exemplary embodiment of FIG. 2A, the frequency-stable power generator system 100 converts the frequency unstable AC power generated by the utility power plant 210 into frequency-stable AC power that is applied to the building power distribution system 230 or at least a portion of the building power distribution system. The building power distribution system 230 includes, for example, a power distribution panel (e.g., circuit breaker panel) which feeds AC power to branch circuits (electrical wiring) connected to the power distribution panel. In a large building with a large load, additional components such as switchgear and transformers are typically used to step-down and distribute utility AC power to a plurality of power distribution panels within the building, which feed AC power to respective branch circuits that feed different regions of the building.

In some embodiments, the frequency-stable power generator system 100 can be disposed in line with a power feed to a given power distribution panel such that the frequency-stable power generator system 100 generates frequency-stable AC power that is applied to the input of the given power distribution panel and distributed to the branch circuits that are fed by the given power distribution panel, e.g., branch circuits that feed a given room comprising the room power distribution system 240. The room power distribution system 240 comprises various components including, e.g., wiring that feeds/connects electrical wall outlets, power distribution units (PDUs), etc. The power consumers 250 include electric components and systems that are powered by the frequency-stable AC power that is supplied by the room power distribution system 240.

Next, FIG. 2B schematically illustrates an exemplary power infrastructure 201 which is similar to the power infrastructure 200 of FIG. 2A except that the frequency-stable power generator system 100 is disposed in the power distribution chain between the building power distribution system 230 and the room power distribution system 240. For example, in some embodiments, the frequency-stable power generator system 100 can be disposed inline at the beginning of a given branch circuit which is fed from a given power distribution panel such that the frequency-stable power generator system 100 generates frequency-stable AC power that is applied to the given branch circuit that feeds power to at least a portion of the room power distribution system 240 (e.g. a plurality of AC electrical outlets in the given room are configured to supply frequency-stable AC power).

Next, FIG. 2C schematically illustrates an exemplary power infrastructure 202 which is similar to the power infrastructure 200 of FIG. 2A except that the frequency-stable power generator system 100 is disposed in the power distribution chain after the room power distribution system 240. For example, in some embodiments, the frequency-stable power generator system 100 can be an apparatus that is plugged into a wall outlet in a given room to receive frequency unstable AC power as input, and then generate and output frequency-stable AC power to one or more power consumers 250 that are plugged into, or otherwise electrically connected to the output of the frequency-stable power generator system 100. In some embodiments, the frequency-stable power generator system 100 can be integrated or otherwise implemented with a PDU that powers, e.g., computers, servers, etc.

Figure 3A:
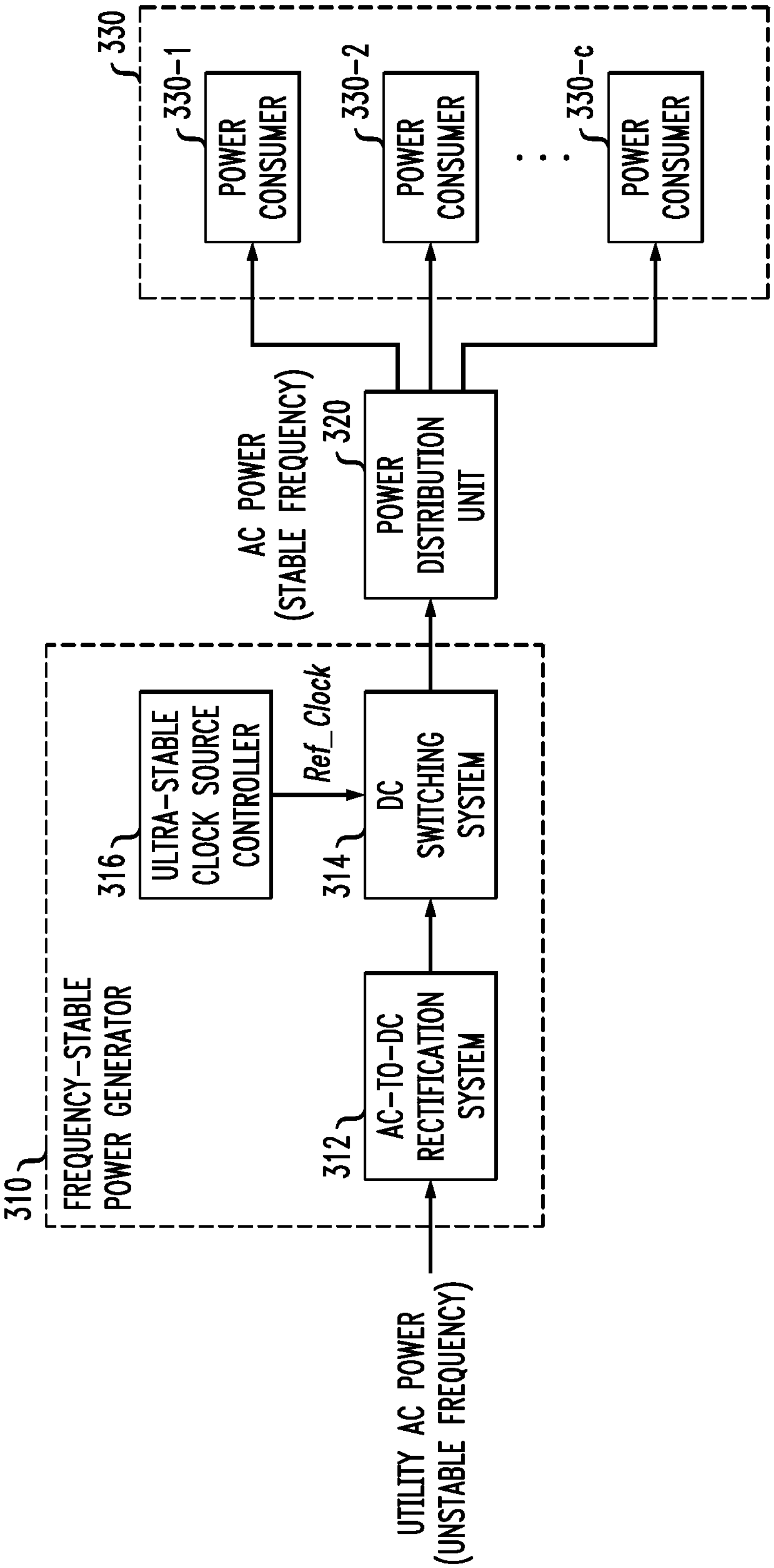
FIG. 3A schematically illustrates a system for generating and distributing frequency-stable AC power, according to an exemplary embodiment of the disclosure.

FIG. 3A schematically illustrates a system for generating and distributing frequency-stable AC power, according to an exemplary embodiment of the disclosure. More specifically, FIG. 3A schematically illustrates a system 300 comprising a frequency-stable power generator system 310, a power distribution unit 320, and a plurality of power consumers 330-1, 330-2, . . . , 330-*c* (collectively, power consumers 330). The frequency-stable power generator system 310 is configured to receive AC utility power (e.g., sinusoidal voltage waveform) having an unstable frequency, and generate AC power having a stable frequency. The frequency-stable AC power is input to the power distribution unit 320. The power distribution unit 320 distributes the frequency-stable AC power to the power consumers 330.

The frequency-stable power generator system 310 comprises an AC-to-DC rectification system 312, a DC switching system 314, and an ultra-stable clock source controller 316. The AC-to-DC rectification system 312 is configured to receive as input utility AC supply power having an unstable utility frequency, as discussed above, and output a positive DC voltage (denoted VP+) and a negative DC voltage (denoted VP−) which correspond to positive and negative voltage peak levels, respectively, of a voltage supply waveform of the utility AC supply power. The ultra-stable clock source controller 316 is configured to generate and output a reference clock signal (denoted Ref Clock) having an ultra-stable frequency that is substantially equal to a nominal utility frequency of the utility AC power (e.g., ultra-stable reference clock signal with a frequency of 60 Hz). For example, in some embodiments, the ultra-stable clock source controller 316 comprises a rubidium atomic clock source, or any other suitable atomic clock source that is utilized to generate an ultra-stable reference clock signal Ref Clock at the desired frequency (e.g., 60 Hz).

The DC switching system 314 is configured to receive as input (i) the positive DC voltage VP+ and negative DC voltage VP− output from the AC-to-DC rectification system 312, and (ii) the ultra-stable reference clock signal Ref Clock, and switch the output of the DC switching system 314 between VP+ and negative DC voltage VP− at the ultra-stable frequency of the reference clock signal Ref Clock. In this regard, in some embodiments, the frequency-stable power generator system 310 receives as input a sinusoidal AC power waveform with an unstable utility frequency, and essentially generates a square wave signal having a stable AC utility frequency.

Figure 3B:
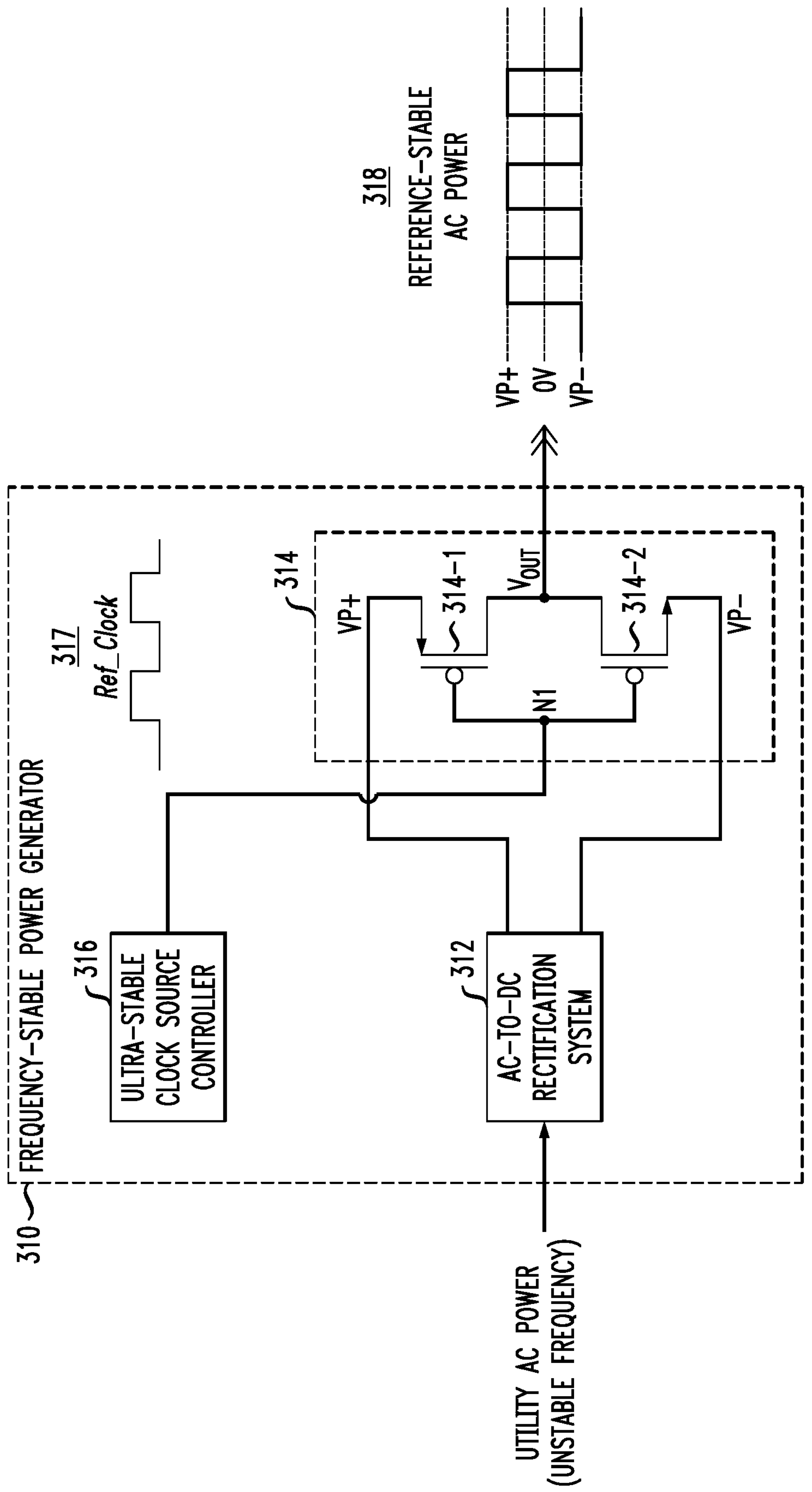
FIG. 3B schematically illustrates an architecture of a frequency-stable power generator system of FIG. 3A, according to exemplary embodiment of the disclosure.

For example, FIG. 3B schematically illustrates an architecture of the frequency-stable power generator system 310 of FIG. 3A, according to exemplary embodiment of the disclosure. In particular, FIG. 3B schematically illustrates an exemplary embodiment of the DC switching system 314 which comprises a power MOSFET inverter comprising a P-channel power MOSFET device 314-1 and an N-channel power MOSFET device 314-2 serially connected between a positive voltage node (e.g., VP+) and a negative voltage node (e.g., VP−). A source terminal of the P-channel power MOSFET device 314-1 is connected to positive voltage node VP+, and a source terminal of the N-channel power MOSFET device 314-2 is connected to the negative voltage node VP−. The power MOSFET devices 314-1 and 314-2 have commonly connected drain terminals which are connected to an output node $V_{OUT}$ of the power MOSFET inverter. The power MOSFET devices 314-1 and 314-2 have commonly connected gate terminals at an input node N1. The ultra-stable clock source controller generates and applies a reference clock (Ref_Clock) 317 to the input node N1 to control the switching power MOSFET inverter.

As schematically illustrated in FIG. 3B, the DC switching system 314 generates and outputs a frequency-stable AC power waveform 318. In an exemplary embodiment, the frequency-stable AC power waveform 318 comprises a square wave waveform in which the amplitude alternates at a stable frequency between a negative voltage VP− and a positive voltage VP+ and maximum values. In an exemplary embodiment where the frequency-unstable utility AC power comprises a sinusoidal voltage waveform with a nominal utility frequency of 60 Hz and a peak voltage of 120 V RMS, the utility AC power would have a positive peak voltage VP+ of about +170V and a negative peak voltage VP− of about −170V. In this instance, the exemplary frequency-stable AC power waveform 318 would have an ultra-stable frequency of 60 Hz signal (with a period of about 16.66 milliseconds), and a positive maximum amplitude of VP+=170V, and negative maximum amplitude of VP−=−170V.

Referring back to FIG. 3A, the frequency-stable AC power waveform 318, which is generated by the frequency-stable power generator system 310, is input to the power distribution unit 320, and then distributed to each of the power consumers 330. The power distribution unit 320 comprises an electrical apparatus that is configured to distribute and manage power supplied to various electronic devices and systems such as computers, servers and networking devices within an equipment room or within a network computing environment such as a datacenter environment. The power distribution unit 320 may comprise a relatively large number of electrical outlets to connect AC power to, e.g., racks of computers and networking equipment IT server cabinets/racks. etc. In some embodiments, the frequency-stable power generator system 310 is implemented as an integral system component of a power distribution unit.

Each power consumer 330 that receives the frequency-stable AC power can utilize the frequency-stable AC power as normal AC power to provide power to system components. For example, a power consumer can be a computer which comprises a power supply unit (PSU) that converts the frequency-stable AC power to low-voltage regulated DC power for the internal components of the computer. In addition, as noted above, a given power consumer can utilize the frequency-stable AC power a system frequency signal (or reference clock signal) to perform functions including, but not limited to, synchronizing operations of the electronic systems and components, controlling clocks in synchronous networks, deriving clock signals with clock operating frequencies as needed for a given application, etc. For example, in a given test environment, some or all of the power consumers 330 can be components of a given system under test (SUT), wherein such power consumers 330 are synchronized using the frequency-stable AC power as a system frequency signal to synchronize operations and generation of requisite clocks signals, etc.

Figure 4:
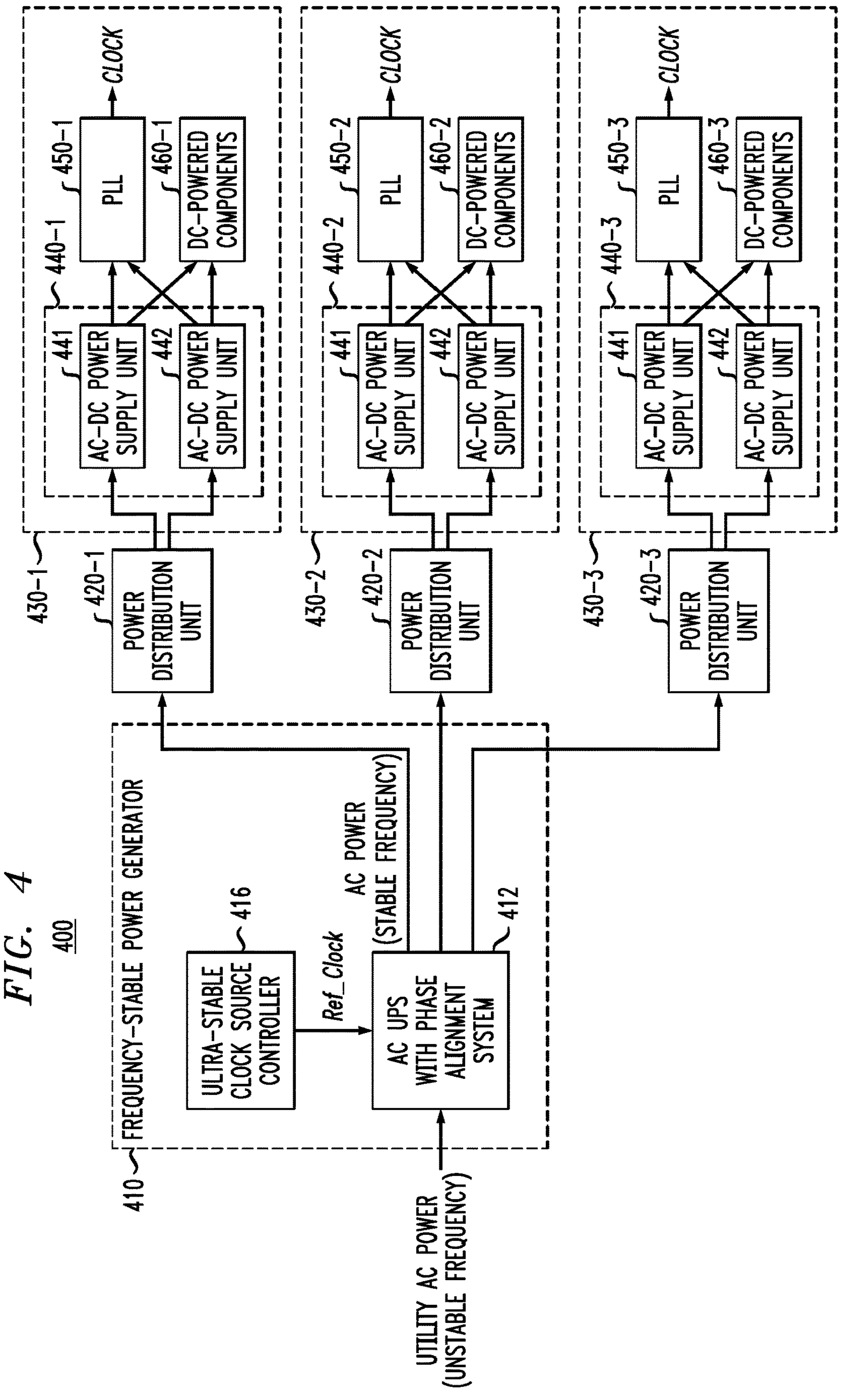
FIG. 4 schematically illustrates a system for generating and distributing frequency-stable AC power, according to another exemplary embodiment of the disclosure.

FIG. 4 schematically illustrates a system for generating and distributing frequency-stable AC power, according to another exemplary embodiment of the disclosure. More specifically, FIG. 4 schematically illustrates a system 400 comprising a frequency-stable power generator system 410, a plurality of power distribution units 420-1, 420-2, and 420-3 (collectively, power distribution units 420), and a plurality of power consumers 430-1, 430-2 and 430-3 (collectively, power consumers 430). The power consumers 430-1, 430-2 and 430-3 comprise respective redundant AC-DC power supply units 440-1, 440-2, and 440-3, wherein each redundant power supply unit 440-1, 440-2, and 440-3 comprises a first AC-DC power supply unit 441 and a second AC-DC power supply unit 442. The redundant AC-DC power supply units 440-1, 440-2, and 440-3 allow each power consumer (e.g., computer) to operate using two or more physical power supplies (e.g., the first and second AC-DC power supply units 441 and 442), each of which being capable of providing the requisite DC power to the respective power consumer in the event of failure of one of the first and second AC-DC power supply units 441 and 442.

Further, in an exemplary embodiment such as shown in FIG. 4, it is assumed that each power consumer 430-1, 430-2 and 430-3 comprises a respective phase-locked loop (PLL) system 450-1, 450-2, and 450-3, and respective DC-powered components 460-1, 460-2, and 460-3. Each PLL system 450-1, 450-2, and 450-3 is coupled to the first and second AC-DC power supply units 441 and 442 of the respective redundant AC-DC power supply units 440-1, 440-2, and 440-3. In addition, the DC-powered components 460-1, 460-2, and 460-3 of the respective power consumers 430-1, 430-2 and 430-3 are coupled to the first and second AC-DC power supply units 441 and 442 of the respective redundant AC-DC power supply units 440-1, 440-2, and 440-3.

Similar to the exemplary embodiments discussed above, the frequency-stable power generator system 410 is configured to receive AC utility power (e.g., sinusoidal voltage waveform) having an unstable frequency, and generate AC power having a stable frequency. The frequency-stable power generator system 410 comprises an AC uninterrupted power supply (AC UPS) 412, and an ultra-stable clock source controller 416. The ultra-stable clock source controller 416 is configured to generate and output a reference clock signal (denoted Ref Clock) having an ultra-stable frequency that is substantially equal to a nominal utility frequency of the utility AC power (e.g., ultra-stable reference clock signal with a frequency of 60 Hz). As noted above, in some embodiments, the ultra-stable clock source controller 416 comprises a rubidium atomic clock source, or any other suitable atomic clock source that is utilized to generate an ultra-stable reference clock signal Ref Clock at the desired frequency (e.g., 60 Hz).

In some embodiments, the AC UPS 412 implements standard UPS functions to provide near-instantaneous protection from input power interruptions, by temporarily supplying AC power using energy that is stored in batteries, or supercapacitors, etc., and to protect electrical components and hardware such as computer and other electrical and electronic equipment from common utility AC power problems such as voltage spikes, sustained overvoltage, voltage sag, noise, harmonic distortion etc. Furthermore, to generate frequency-stable AC power, the AC UPS 412 comprises a phase alignment system which is configured to align the phase/frequency of the input utility AC power with the phase/frequency of the ultra-stable reference clock signal Ref Clock which is generated and output from the ultra-stable clock source controller 416. The phase alignment system of the AC UPS 412 can be implemented using known systems and techniques, which are suitable for the given application.

The frequency-stable AC power, which is generated by the frequency-stable power generator system 410, is input to the power distribution units 420-1, 420-2, and 420-3, and distributed to the respective power consumers 430-1, 430-2, and 430-3, which may or may not be in the same equipment room of a building. The redundant AC-DC power supply units 440-1, 440-2, and 440-3 utilize the frequency-stable AC power to generate low-voltage regulated DC power for the internal DC-powered components 460-1, 460-2, and 460-3 of the respective power consumers 430-1, 430-2, and 430-3. In addition, the redundant AC-DC power supply units 440-1, 440-2, and 440-3 utilize the frequency-stable AC power to forward the ultra-stable reference frequency signal of the AC power to the respective PLL systems 450-1, 450-2, and 450-3, which utilize the ultra-stable reference frequency signal of the AC power as a reference clock signal to generate respective clock signals Clock which are synchronized.

In some embodiments, the PLL systems 450-1, 450-2, and 450-3 are utilized for synchronization to allow associated circuit boards or systems to synchronize the phases of the respective on-board clocks with an external reference clock signal provided by the ultra-stable reference frequency signal of the AC power. The PLL systems 450-1, 450-2, and 450-3 enable synchronization when performing, e.g., data acquisition operations, since the PLL systems allow multiple circuit boards to lock to a shared reference signal and synchronize the phases of their respective sample clocks, thereby allowing each circuit board or system to take a measurement at precisely the same instant.

In some exemplary embodiments, for quantum computing applications, the PLL systems 450-1, 450-2, and 450-3 are configured to generate local oscillator (LO) clock signals which are utilized in conjunction with I/Q modulation systems of arbitrary waveform generators (AWGs) to generate control pulses for controlling quantum bits (qubits) to perform high-fidelity qubit gate operations (e.g., single-qubit gate operations, entanglement gate operations, etc.). As is known in the art, the state of a superconducting qubit can be changed by applying a radio frequency (RF) control pulse with a center frequency that is equal to a transition frequency. In some embodiments, the PLL systems 450-1, 450-2, and 450-3 can be configured to generate RF clock signals that have a same RF frequency or different RF frequencies, depending on the application.

Figure 5:
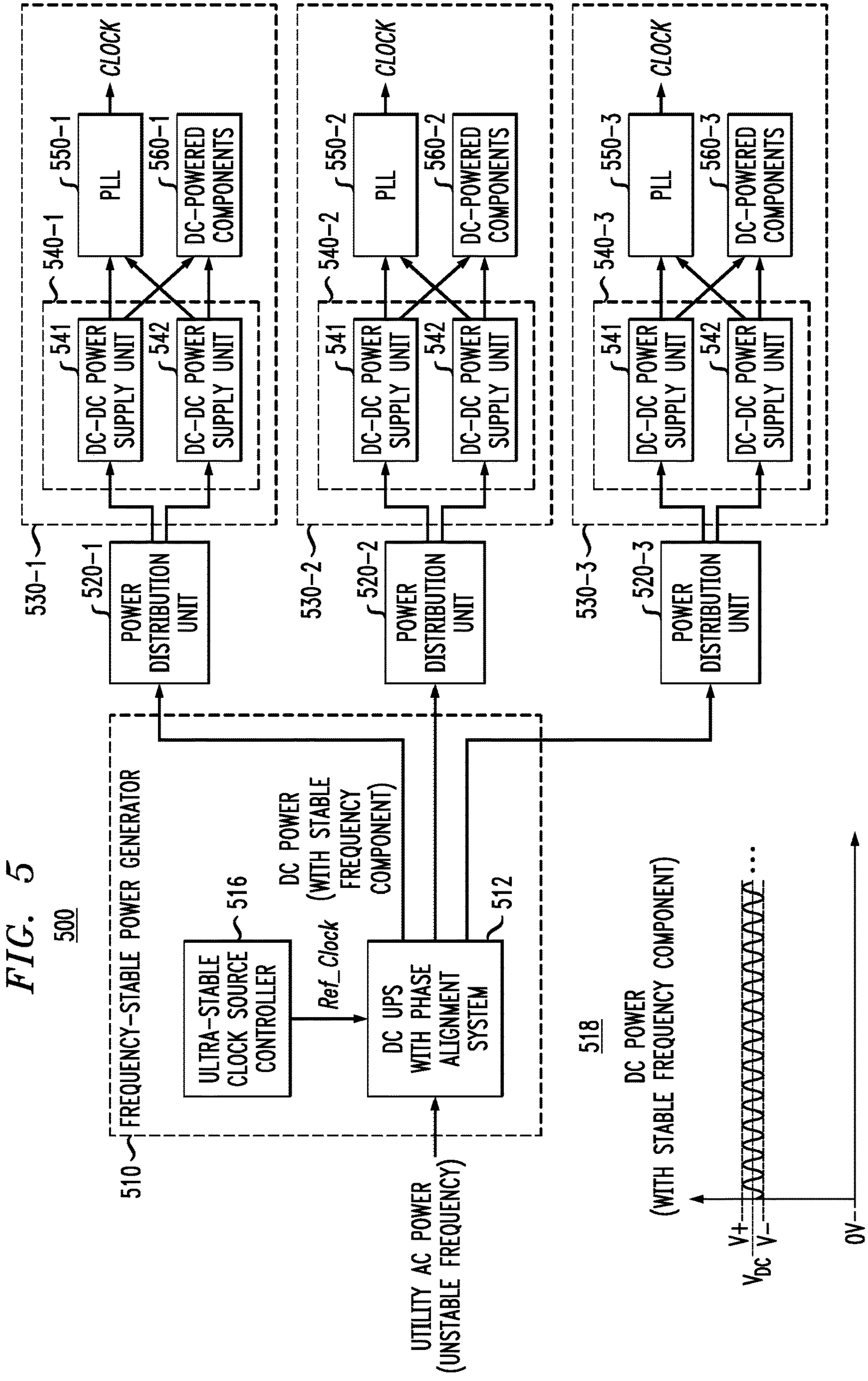
FIG. 5 schematically illustrates a system for utilizing a utility power infrastructure to generate DC power with a stable reference frequency component, according to another exemplary embodiment of the disclosure.

FIG. 5 schematically illustrates a system for utilizing a utility power infrastructure to generate DC power with a stable reference frequency component, according to another exemplary embodiment of the disclosure. More specifically, FIG. 5 schematically illustrates a system 500 comprising a frequency-stable power generator system 510, a plurality of power distribution units 520-1, 520-2, and 520-3 (collectively, power distribution units 520), and a plurality of power consumers 530-1, 530-2 and 530-3 (collectively, power consumers 530). The power consumers 530-1, 530-2 and 530-3 comprise respective redundant DC-DC power supply units 540-1, 540-2, and 540-3, wherein each redundant DC-DC power supply unit 540-1, 540-2, and 540-3 comprises a first DC-DC power supply unit 541 and a second DC-DC power supply unit 542. The redundant DC-DC power supply units 540-1, 540-2, and 540-3 allow each power consumer (e.g., computer) to operate using two or more physical power supplies (e.g., the first and second DC-DC power supply units 541 and 542), each of which being capable of providing the requisite DC power to the respective power consumer in the event of failure of one of the first and second DC-DC power supply units 541 and 542.

Further, similar to the exemplary embodiment of FIG. 4, it is assumed that each power consumer 530-1, 530-2 and 530-3 comprises a respective PLL system 550-1, 550-2, and 550-3, and respective DC-powered components 560-1, 560-2, and 560-3. Each PLL system 550-1, 550-2, and 550-3 is coupled to the first and second DC-DC power supply units 541 and 542 of the respective redundant DC-DC power supply units 540-1, 540-2, and 540-3. In addition, the DC-powered components 560-1, 560-2, and 560-3 of the respective power consumers 530-1, 530-2 and 530-3 are coupled to the first and second DC-DC power supply units 541 and 542 of the respective redundant DC-DC power supply units 540-1, 540-2, and 540-3.

In the exemplary embodiment of FIG. 5, the frequency-stable power generator system 510 comprises a DC uninterrupted power supply (DC UPS) 512, and an ultra-stable clock source controller 516. The frequency-stable power generator system 510 is configured to receive AC utility power (e.g., sinusoidal voltage waveform) having an unstable frequency, and generate DC power 518 having a small amplitude stable frequency component and with a DC offset that corresponds to the DC voltage output from the DC UPS 512. The ultra-stable clock source controller 516 is configured to generate and output a reference clock signal (denoted Ref Clock) having an ultra-stable frequency that is substantially equal to a nominal utility frequency of the utility AC power (e.g., ultra-stable reference clock signal with a frequency of 60 Hz). As noted above, in some embodiments, the ultra-stable clock source controller 516 comprises a rubidium atomic clock source, or any other suitable atomic clock source that is utilized to generate an ultra-stable reference clock signal Ref Clock at the desired frequency (e.g., 60 Hz).

In some embodiments, the DC UPS 512 implements standard UPS functions including deriving power from utility AC power input and generating and outputting a DC voltage, while providing backup power from integrated batteries. Furthermore, the DC UPS 512 comprises a phase alignment system which is configured to align the phase/frequency of the input utility AC power with the phase/frequency of the ultra-stable reference clock signal Ref_Clock which is generated and output from the ultra-stable clock source controller 516, and generate a small amplitude reference clock signal that is mixed with the output DC voltage to generate DC power 518 with an ultra-stable frequency component superimposed on top of the output DC voltage. For example, in some embodiments, such as such in FIG. 5, the DC power 518 output from the frequency-stable power generator system 510 comprises a DC offset voltage $V_{DC}$, which corresponds to the DC output voltage generated by the DC UPS 512, and a stable frequency component 518-1 which is superimposed on the DC voltage, and which comprises a low amplitude AC signal that which oscillates between a maximum amplitude V+ a minimum amplitude V−.

The DC power 518 with the ultra-stable frequency component, which is generated by the frequency-stable power generator system 510, is input to the power distribution units 520-1, 520-2, and 520-3, and distributed to the respective power consumers 530-1, 530-2, and 530-3, which may or may not be in the same equipment room of a building. The redundant DC-DC power supply units 540-1, 540-2, and 540-3 utilize the DC power 518 to generate low-voltage regulated DC power for the internal DC-powered components 560-1, 560-2, and 560-3 of the respective power consumers 530-1, 530-2, and 530-3. In addition, the redundant DC-DC power supply units 540-1, 540-2, and 540-3 extract the ultra-stable frequency component 518-1 of the distributed DC power 518 and forward the ultra-stable frequency component 518-1 to the respective PLL systems 550-1, 550-2, and 550-3, which utilize the ultra-stable frequency component 518-1 as a reference clock signal to generate respective clock signals Clock which are synchronized and utilized for various purposes such as discussed above.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a power generator configured to receive as input utility power having an unstable utility frequency, and generate supply power from the utility power, with the supply power having a stable frequency component corresponding to a nominal frequency of the utility power; and a power distribution system, coupled to an output of the power generator, and configured to distribute the supply power having the stable frequency component, which is generated and output from the power generator, to at least one power consumer which is configured to utilize the stable frequency component of the supply power as a reference frequency.

2. The system of claim 1, wherein the supply power comprises alternating current (AC) supply power having a stable frequency which corresponds to a nominal utility frequency of the utility power.

3. The system of claim 2, wherein the AC supply power comprises a square wave signal.

4. The system of claim 1, wherein the supply power comprises direct current (DC) supply power having a DC voltage and a stable frequency component which is superimposed on the DC voltage, and which comprises a frequency that corresponds to a nominal utility frequency of the utility power.

5. The system of claim 1, wherein the power generator is integrated with a power distribution unit.

6. The system of claim 1, wherein the power generator comprises:

a clock source controller configured to generate and output a reference clock signal having an ultra-stable frequency that is substantially equal to a nominal utility frequency of the utility power;

power rectification system configured to rectify the utility power to generate a first direct current (DC) voltage and a second DC voltage correspond to positive and negative voltage peak levels of the utility power; and a switching system configured to receive the reference clock signal, the first DC voltage, and the second DC voltage, and switch an output of the switching system between the first DC voltage and the second DC voltage at the frequency of the reference clock signal.

7. The system of claim 6, wherein the clock source controller is configured to generate and output the reference clock signal using an atomic clock signal.

8. The system of claim 1, wherein the power generator comprises:

a clock source controller configured to generate and output a reference clock signal having an ultra-stable frequency that is substantially equal to a nominal utility frequency of the utility power; and an uninterrupted power supply configured to convert the utility power into alternating current (AC) supply power having a frequency aligned to the ultra-stable frequency of the reference clock signal.

9. The system of claim 1, wherein the power generator comprises:

a clock source controller configured to generate and output a reference clock signal having an ultra-stable frequency that is substantially equal to a nominal utility frequency of the utility power; and an uninterrupted power supply configured to convert the utility power into direct current (DC) supply power having a DC voltage and a frequency component which corresponds to the ultra-stable frequency of the reference clock signal.

10. The system of claim 1, wherein the power distribution system comprises a power distribution panel which distributes power to one or more branch circuits.

11. The system of claim 1, wherein the power distribution system comprises a power supply unit that is configured to extract the stable frequency component from the distributed supply power and provide the stable frequency component to a system component which utilizes the stable frequency component as a system reference.

12. An apparatus comprising a power generator configured to receive as input utility power having an unstable utility frequency, and utilize an atomic clock signal to generate supply power from the utility power, with the supply power having a stable frequency component for use as a system reference, wherein the stable frequency component has a frequency that corresponds to a frequency of the atomic clock signal.

13. The apparatus of claim 12, wherein the atomic clock signal comprises a frequency that is substantially equal to a nominal utility frequency of the utility power.

14. The apparatus of claim 12, wherein the supply power generated by the apparatus comprises an alternating current (AC) power waveform having a frequency which corresponds to the frequency of the atomic clock signal.

15. The apparatus of claim 14, wherein the AC power waveform comprises a square wave signal.

16. The apparatus of claim 12, wherein the supply power generated by the apparatus comprises direct current (DC) supply power having a DC voltage and the stable frequency component superimposed on the DC voltage.

17. A method comprising:

generating supply power from utility power having an unstable utility frequency, with the supply power having a stable frequency component corresponding to a nominal frequency of the utility power; and distributing the generated supply power having the stable frequency component to at least one power consumer which is configured to utilize the stable frequency component of the supply power as a reference frequency.

18. The method of claim 17, wherein the supply power comprises alternating current (AC) supply power having a stable frequency which corresponds to a nominal utility frequency of the utility power.

19. The method of claim 17, wherein the supply power comprises direct current (DC) supply power having a DC voltage and a stable frequency component which is superimposed on the DC voltage, and which comprises a frequency that corresponds to a nominal utility frequency of the utility power.

20. The method of claim 17, wherein generating the supply power from the utility power, comprises:

generating a reference clock signal having an ultra-stable frequency that is substantially equal to a nominal utility frequency of the utility power;

rectifying the utility power to generate a first direct current (DC) voltage and a second DC voltage correspond to positive and negative voltage peak levels of the utility power; and utilizing the reference clock signal, the first DC voltage, and the second DC voltage, to generate the supply power by switching between the first DC voltage and the second DC voltage at the frequency of the reference clock signal.

* * * * *